United States Patent [19]
Haskin et al.

[11] Patent Number: 5,775,665
[45] Date of Patent: Jul. 7, 1998

[54] SECURITY MOUNTING ASSEMBLY

[75] Inventors: Igor Haskin, Skokie; Joseph Tcherny, Desplaines, both of Ill.

[73] Assignee: Peerless Industries, Melrose Park, Ill.

[21] Appl. No.: 718,664

[22] Filed: Sep. 25, 1996

[51] Int. Cl.$^6$ .................................................. F16M 13/00
[52] U.S. Cl. ...................... 248/551; 248/349.1; 248/922; 248/415
[58] Field of Search ...................... 248/551, 349.1, 248/917, 919, 922, 131, 415, 552, 553, 220.22, 221.11, 222.14, 224.7, 188.8; 70/58, DIG. 57, 232

[56] References Cited

U.S. PATENT DOCUMENTS

| | | |
|---|---|---|
| 1,468,247 | 9/1923 | Patten ........................ 248/349.1 X |
| 1,664,835 | 4/1928 | Stevens . |
| 1,732,113 | 10/1929 | Van Der Meer . |
| 1,892,408 | 12/1932 | Paalman . |
| 2,451,110 | 10/1948 | Newman . |
| 2,762,670 | 9/1956 | Cantwell ........................ 248/188.8 |
| 2,830,862 | 4/1958 | Wright . |
| 3,067,976 | 12/1962 | Popowitz . |
| 3,302,594 | 2/1967 | Barnett et al. . |
| 3,570,800 | 3/1971 | Cycowicz ........................ 248/415 |
| 3,572,861 | 3/1971 | Rogers et al. . |
| 3,593,954 | 7/1971 | Ritchie ........................ 248/415 X |
| 3,908,942 | 9/1975 | Keith et al. ........................ 248/922 X |
| 3,931,949 | 1/1976 | Waligorski et al. . |
| 4,098,485 | 7/1978 | Mizelle ........................ 248/425 |
| 4,401,287 | 8/1983 | Moeser . |
| 4,410,159 | 10/1983 | McVicker et al. . |
| 4,433,954 | 2/1984 | Fujita . |
| 4,437,701 | 3/1984 | Mizelle . |
| 4,526,336 | 7/1985 | Durivault et al. . |
| 4,635,894 | 1/1987 | Sammons . |
| 4,687,167 | 8/1987 | Skalka et al. ........................ 248/919 X |
| 4,693,891 | 9/1987 | Dionne ........................ 248/551 |
| 4,705,256 | 11/1987 | Hofrichter ........................ 248/349.1 X |
| 4,762,237 | 8/1988 | Newton . |
| 4,884,420 | 12/1989 | Finkel et al. ........................ 248/551 X |
| 4,901,973 | 2/1990 | Ferrara . |
| 5,000,513 | 3/1991 | Schmidt . |
| 5,031,779 | 7/1991 | Szenay et al. . |
| 5,080,322 | 1/1992 | Harley . |
| 5,359,741 | 11/1994 | Lang . |
| 5,383,641 | 1/1995 | Bergetz . |

FOREIGN PATENT DOCUMENTS 159371  3/1933  Switzerland ........................ 248/349.1

Primary Examiner—Ramon O. Ramirez
Assistant Examiner—Stephen S. Wentsler
Attorney, Agent, or Firm—Lockwood, Alex, FitzGibbon & Cummings

[57] ABSTRACT

A security mounting assembly for an electrical appliance, such as a color television monitor, includes a mounting ring which may be attached to a flat mounting surface by a series of fasteners. The mounting ring includes glide members disposed thereon radially outwardly of the fasteners and the mounting ring is captured between two flanges attached to a flat support tray. The support tray is attached to the television with fasteners and swivels in place upon the attachment ring.

19 Claims, 3 Drawing Sheets

SECURITY MOUNTING ASSEMBLY

BACKGROUND OF THE INVENTION

The present invention relates generally to devices for securely mounting large electrical appliances, such as televisions to a surface, and more particularly to a security mounting device with an enclosed turntable.

Large electrical appliances, such as televisions and monitors, are commonly used in hotels, motels and hospitals. These appliances, because of their cost, present attractive targets to thieves and burglars. Theft of these items is costly and constitutes a serious problem to hotel chains, hospitals and the like. A need therefore exists for apparatus to securely mount these appliances and other electrical appliances such as computers, microwave and ovens and the like.

Some security mounting systems exist and rely upon cables, such as that shown in U.S. Pat. No. 4,268,099, while others such as that shown in U.S. Pat. No. 4,738,428 utilize locking bars and straps. These mounting systems are complicated in that they require extraneous components that must be threaded or intertwined with the mounting assemblies, and they can often be compromised by use of a crowbar.

The present invention provides a security mounting system for relatively inexpensive cost and which securely mounts these electrical appliances to flat mounting surfaces such as table and counter tops. Simultaneously, the present invention provides the security mounting system with a rotatable portion enclosed within the mounting assembly so that the appliance mounted thereon is at least partially rotatable on its mounting surface.

In accordance with the present invention, a turntable assembly is provided as part of the mounting assembly and includes a stationary attachment ring to which a series of glides are mounted. The attachment ring is held within one or more flanges which cooperatively define a clamp assembly disposed on the bottom of an appliance mounting tray. The glides provide multiple bearing points to facilitate rotation of the appliance on the mounting assembly.

The appliance is secured to the mounting tray by means of one set of fasteners which pass through the mounting tray into apertures aligned on the bottom of the appliance. This set of fasteners maintain the appliance in a preselected orientation as the mounting tray. Another set of fasteners pass through openings in the attachment ring in order to secure the attachment ring to a mounting surface. These fasteners are located in the attachment ring interior of the glides and are spaced apart from the mounting surface by a series of spacers. The glides are thus held stationary within the attachment ring.

Two interengaging flanges, or clamps, are mounted to the appliance mounting tray and cooperate to define an enclosure which surrounds and at least partially encloses the attachment ring to, in effect, capture the stationary attachment ring within a race. Thus, the mounting tray is rotatably mounted on the attachment ring and permits the appliance to swivel in place after mounting.

Accordingly, it is an object of the present invention to provide a secure mounting means for mounting an electrical appliance, such as a television receiver, to a flat surface wherein the mounting means includes a rotatable turntable enclosed within the mounting means.

It is another object of the present invention to provide a mounting assembly for securely mounting a television receiver to a flat surface in which the exterior cabinet of the television receiver is supported on a planar support member and engaged therewith by a series of fasteners and in which the planar support member includes one or more flanges which define a security enclosure beneath the planar base member, the flanges securely enclosing a base attachment member which is attached to the flat surface, the base attachment member having a plurality of bearings supported thereon which give the planar support member the ability to rotate relative to the base attachment member.

It is still another object of the present invention to provide a mounting assembly having a base attachment member in the form of a ring, the base attachment member having means for secure attachment to a flat mounting surface and a plurality of glides operatively associated therewith, the attachment member being held between opposing, engaging flange members which in turn are attached to an upper support plates, whereby the upper support plate and an appliance supported thereon rotate with respect to and upon the base attachment ring, but nevertheless enclose the attachment ring to thereby prevent access to its secure attachment means.

These and other objects, features and advantages of the present inventions will be apparent through a reading of the following detailed description, taken in conjunction with the accompanying drawings, wherein like reference numerals refer to like parts.

BRIEF DESCRIPTION OF THE DRAWINGS

Throughout the course of this detailed description, reference will be made to the following drawings in which.

DETAILED DESCRIPTION OF THE INVENTION

Figure 1:
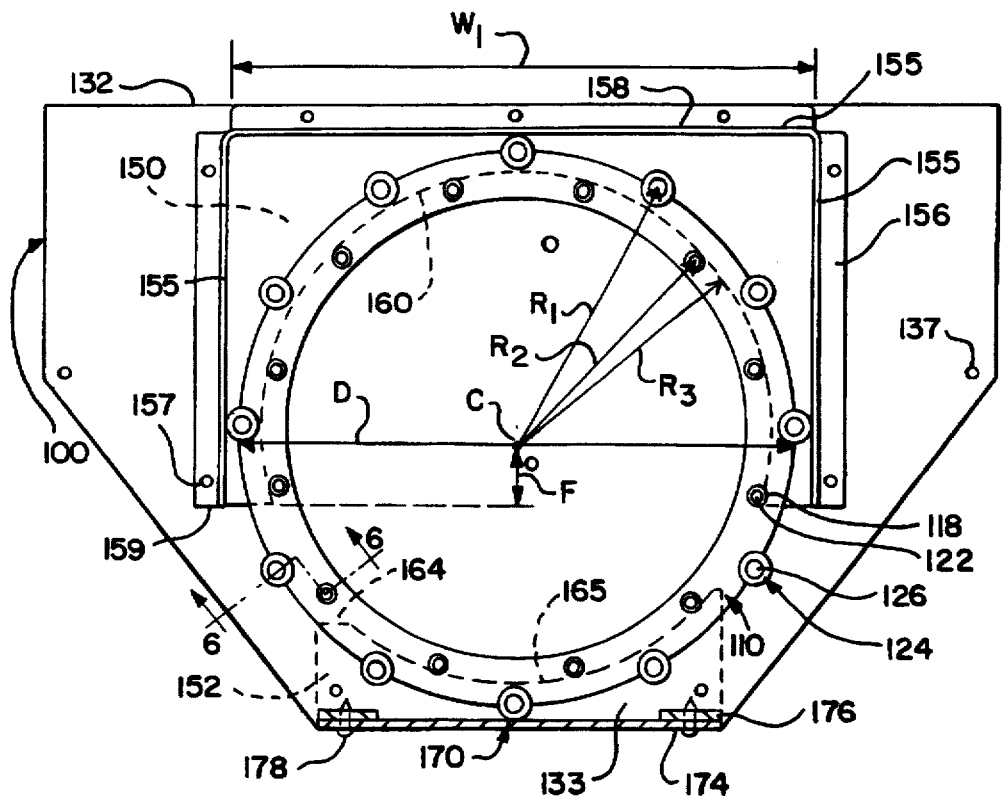
FIG. 1 is a plan view of a mounting assembly constructed in accordance with the principles of the present invention taken from the bottom of the mounting assembly looking up with the lower portions of the flanges removed for clarity and the extent of the flanges shown in phantom.

A mounting assembly constructed in accordance with the principles of the present invention is illustrated generally at 100 in FIGS. 1 & 7. As shown in FIG. 7, the mounting assembly 100 is used to support a large electrical appliance, such as the television receiver or monitor 50 shown, upon a flat mounting surface 102, such as a countertop. The television is conventional and includes a viewing screen 51 held within an exterior housing 52 and which is joined to a base portion 54.

The mounting assembly 100 includes an flat appliance support plate, or tray 130, having a planar support surface 131 upon which the appliance 50 rests. The support tray 130 preferably has length and width dimensions that are large enough to suitably support the appliance 50 thereon. The support tray 130 has opposing forward and rear edges 132, 133 respectively and the forward edge 132 of the support tray 130 may have a width greater than the width of the rear edge 133.

The support tray 130 may further include a plurality of openings 137 extending completely through the tray 130 and which are adapted to permit the passage therethrough of a set of fasteners 138. These fasteners are received in corresponding mounting holes (not shown) formed in the bottom of the base portion 54 of the appliance 50 in the manner described in U.S. Pat. No. 5,383,641, issued Jan. 24, 1995 and assigned to the assignee of the present invention, the disclosure of which is herein incorporated by reference. These fasteners 138 may be security-style fasteners as described below and they serve to attach the appliance 50 to the appliance support tray 130. The support tray 130 may further include, if necessary, vertical ledges 139 for attachment to vertical sides of the appliance 50.

The support tray 130 is utilized to mount the appliance to a flat support surface in a manner which permits the appliance to swivel, or rotate about a central axis C of the mounting assembly 100, without compromising the integrity of the mounting assembly from a security consideration. In this regard and in an important aspect of the present invention, the mounting assembly 100 includes a rotating support means, illustrated in FIGS. 1 & 2, as an annular attachment ring 110. The attachment ring 110 is preferably formed from a durable metal and may be suitably stamped or die-cut from a sheet metal blank. The attachment ring 110 has distinct inner and outer perimeters 111, 112 which define a ring body portion 113 therebetween.

Figure 2:
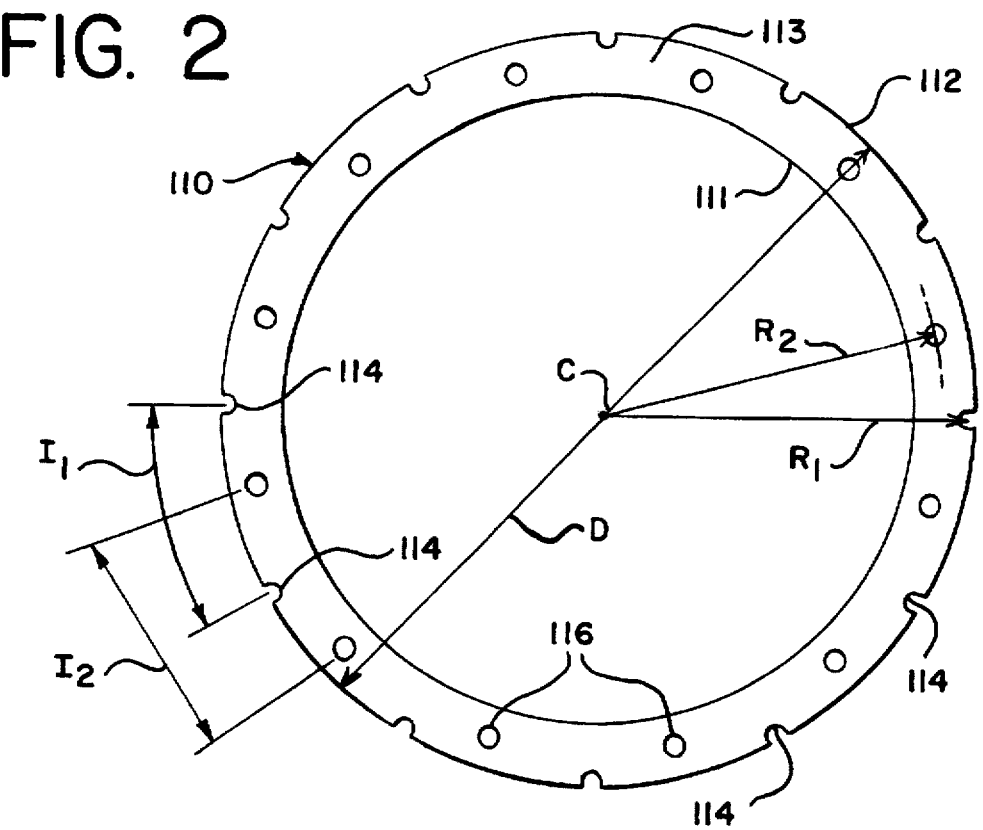
FIG. 2 is a plan view of the attachment ring of the mounting assembly of FIG. 1.
Figure 3:
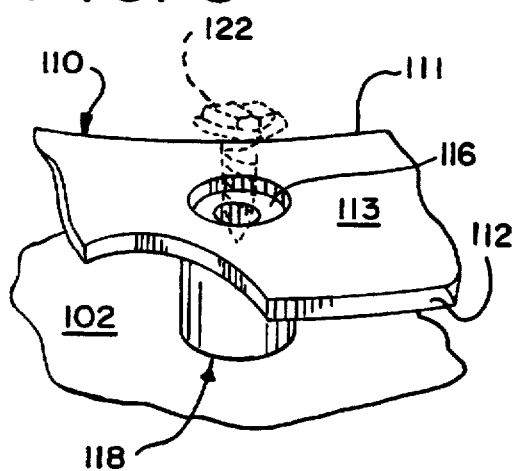
FIG. 3 is an enlarged detail view of the body portion of the attachment ring illustrating the placement of a support spacer thereon.
Figure 4:
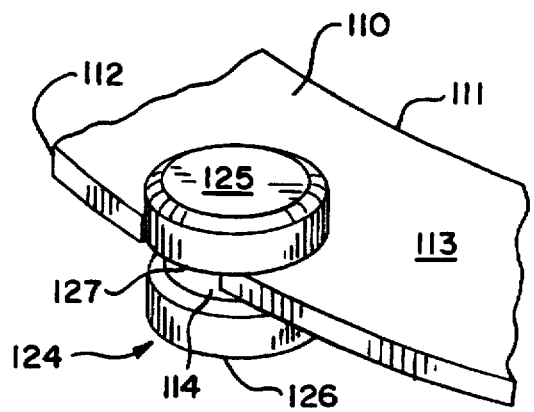
FIG. 4 is an enlarged detail view of the outer edge of the attachment ring and illustrating a bearing means fitted in place thereon.
Figure 5:
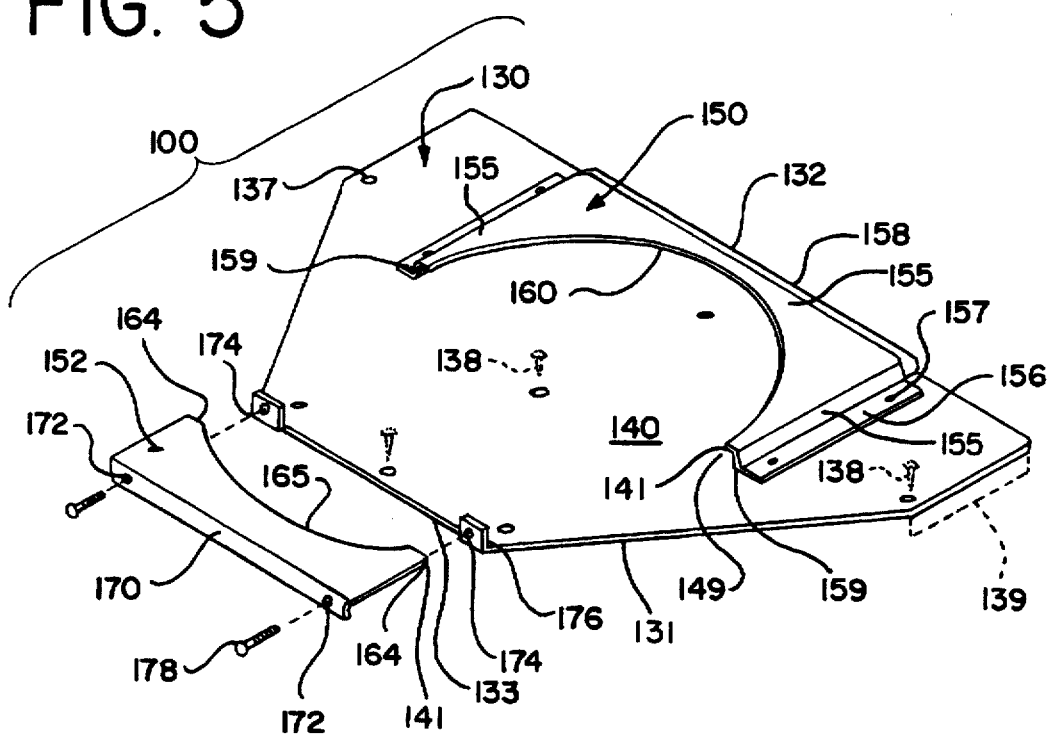
FIG. 5 is an exploded perspective view, taken from the underside, of the support plate of the mounting assembly of FIG. 1.

A series of openings 114, 116 are present in the attachment ring 110. One set of the openings 114 is formed at specific intervals $I_1$ along the outer perimeter 112 of the attachment ring 110, while the other set of openings 116 is formed within the body portion 113 of the attachment ring 110, also at specific intervals $I_2$, shown interspersed between pairs of openings 114. The intervals may be uniform as illustrated, or varied to accommodate the height and diameter of the spacers 118 and glides 124. As illustrated in FIG. 2, the two sets of openings 114, 116 are staggered in their intervals along the attachment ring body portion 113 so that any given opening 114 is flanked by two of the other openings 116 and vice-versa.

Figure 6:
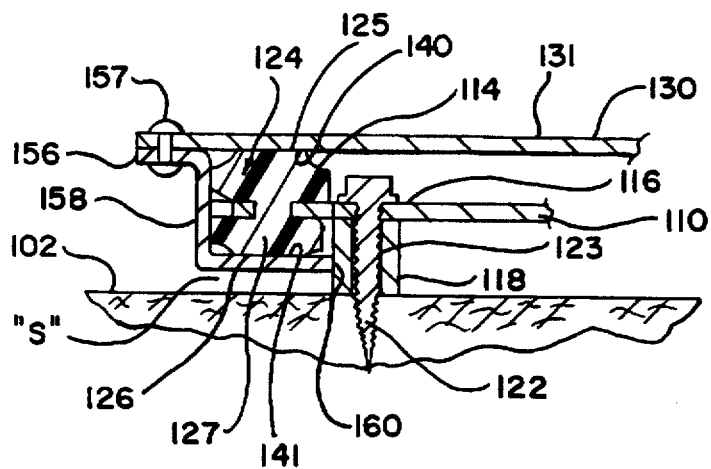
FIG. 6 an enlarged detail sectional view taken through a portion of the of the mounting assembly of FIG. 1, along lines 6—6 thereof; and, FIG. 7 is an elevational view of the mounting assembly of FIG. 1 in place on a flat surface and supporting an appliance.

One set of the openings 116 is generally associated with a like number of individual, hollow cylindrical spacers 118 that support the attachment ring 110 away from and above the support surface 102. A set of fasteners 122, shown as screws, are used to firmly secure the attachment ring 110 to the support surface 102 as illustrated in FIG. 6. The spacers 118 may be cylindrical as illustrated and hollow. They each contain a central bore 123 through which the shank of one screw 122 passes. The height of the spacers 118 may be chosen to accommodate various different appliances, but for the most part, it will not be great enough to permit a large space underneath the support tray 130 and attachment ring 110 for a crowbar or other prying device to fit between.

The other set of openings 114 of the attachment ring 110 receive a plurality of bearing means therein, illustrated in the Figures as a plurality of glide members 124 having respective enlarged opposing top and bottom head portions interconnected by a central portion 127 of reduced diameter. The head portions of the glides include respective enlarged glide surfaces 125, 126 formed thereon which respectively oppose the underside 140 of the support tray and the top interior bearing surfaces 141 of two enclosure flanges 150, 152.

As shown in FIGS. 1-6, the mounting assembly 100 includes an enclosure 149 that, in essence, captures the attachment ring 110 in a manner that permits the support tray 130 to rotate or swivel freely in an unimpeded manner in a complete circle around the attachment ring 110. The enclosure 149 is formed from two flanges 150, 152 that are attached to the support tray 130 and which form a race for the guide members 124.

The first flange 150 has a width $W_1$ that exceeds the outer diameter D of the attachment ring 110. The flange 150 is preferably drawn from sheet metal in a manner that defines three distinct sidewalls 155 thereof. The sidewalls 155 extend from the flange 150 into contact with the underside 140 of the support tray 130 by a series of feet 156 through which rivets 157 may extend to rigidly attach the flange 150 to the support tray 130. (FIG. 6.) The leading edge 158 of the first flange 150, as defined by a front sidewall 155 thereof, is located close to the forward edge of the support tray 130. The two trailing edges 159 of the flange 150 extend rearwardly of the center C of the attachment ring 110 by the distance F shown in FIG. 1.

The trailing edges 159 of the flange 150 can be seen as interconnected by a curved edge 160 and is positioned between respective radii $R_1$, $R_2$ of the attachment ring glide members 124 and spacers 118. In other words, the interior edge 160 of the flange 150 has a radius $R_3$ of a distance at which the flange edge 160 is interposed between the attachment ring spacers 118 and their associated fasteners 122, and the attachment ring glide members 124 to thereby allow complete and unimpeded rotation of the support tray 130 on the attachment ring 110. As seen in FIG. 6, the interior edge 160 may approximately abut the exterior of the spacers 118.

The second flange 152 is likewise formed with two trailing edges 164 that are interconnected by an interior curved edge 165 having a radius generally equal to that of the first flange 150 ($R_3$). The trailing edges 164 of the second flange 152 may be spaced somewhat apart from their first flange counterparts 159 as illustrated in FIG. 1, or they may be adjacent thereto. The second flange 152 further has an endwall, or leading edge 170, that has one or more apertures 172 formed therein in alignment with like apertures 174 formed in a pair of anchor tabs or legs 176 as shown. Security fasteners 178, such as tamperproof or specially-keyed screws which cannot be engaged by conventional tools, such as blade, Phillips-head or Allen-head screwdrivers, and are used to attach the second flange 152 to the support tray 130 after the support tray 130 and the appliance 50 is inserted over the attachment ring 110.

The two flanges 150, 152 cooperatively form an enclosure that captures the attachment ring 110 in a manner that permits unimpeded rotation of the support tray 130. The flanges 150, 152 preferably depend downwardly a sufficient extent as shown in FIG. 6 to prohibit entry of a prying tool, such as a crowbar into the space S between the flange 150 and the support surface 102.

While the preferred embodiment of the invention have been shown and described, it will be understood by those skilled in the art that changes or modifications may be made thereto without departing from the true spirit and scope of the invention.

We claim:

1. A rotatable mounting assembly for mounting an electrical appliance to a support surface, comprising:

a base member adapted to mate with the support surface, the base member having a plurality of mounting apertures therethrough to permit passage of first fasteners for fastening said base member to said support surface;

a support tray dimensioned to receive the appliance thereon, the support tray including a pair of flanges extending along a bottom surface of said support tray, the flanges cooperatively defining an enclosure that receives and houses said base member therein in a manner such that said support tray is rotatable upon said base member and said pair of flanges are rotatable around the base member, said support tray further including a plurality of apertures extending therethrough to permit the passage of second fasteners for fastening said appliance to said support tray; and said mounting assembly further including a plurality of glide members disposed on said base member radially outwardly of said Plurality of mounting apertures of said base member, the plurality of glide members facilitating rotation of said support tray relative to said base member, said base member includinq an annular ring with a plurality of recesses formed in an outer perimeter of said annular ring, said plurality of glide members each being received in a corresponding one of said plurality of recesses.

2. The mounting assembly as defined in claim 1, further including a plurality of cylindrical spacers interposed between said base member and said support surface, each of said plurality of spacers being associated with a corresponding one of said plurality of mounting apertures of said base member.

3. The mounting assembly as defined in claim 2, wherein said plurality of spacers are hollow and wherein said first fasteners are capable of extending through said base member and said plurality of spacers into said support surface.

4. The mounting assembly as defined in claim 1, wherein each of said plurality of glide members include two opposing glide heads separated by a central neck portion, each of the glide neck portions being received in said corresponding one of said plurality of recesses.

5. The mounting assembly as defined in claim 4, wherein said glides heads include distinct upper and lower glide surfaces that respectively contact the underside of said support tray and interior surfaces of said flanges.

6. The mounting assembly as defined in claim 1, wherein said plurality of glide members are formed from a lubricous material.

7. The mounting assembly as defined in claim 1, wherein one of said flanges is attached to a horizontal surface of said support tray and the other of said flanges is attached to a vertical surface of said support tray, said two flanges extending from opposite ends of said support tray toward each other to enclose said base member.

8. The mounting assembly as defined in claim 7, wherein said support tray includes a pair of downwardly depending engagement tabs and said other of said flanges is attached to said engagement tabs by a third set of fasteners.

9. The mounting assembly as defined in claim 1, wherein said plurality of glide members are disposed on said attachment ring between pairs of adjacent spacers.

10. The mounting assembly as defined in claim 1, wherein said flanges have arcuate interior edges that are disposed radially between said plurality of mounting apertures and said plurality of glide members.

11. A mounting assembly for a television having an exterior housing portion, the mounting assembly comprising, in combination: an attachment ring for securing the television to a surface, the attachment ring having an inner diameter and an outer diameter and a ring body of preselected thickness disposed between said inner and outer diameters, the ring body having a plurality of apertures therein adapted to receive a corresponding plurality of first fastening members extending through said ring body to secure said attachment ring to the surface, said mounting assembly including a plurality of spacers for spacing said attachment ring from said surface, each of said plurality of spacers being associated with a corresponding one of said plurality of apertures of said attachment ring; said attachment ring further including a plurality of recesses disposed therein along said outer diameter thereof, each of said recesses having a glide member disposed therein, said glide members being disposed in said attachment ring radially outwardly of said spacers; a tray member rotatably connected to said attachment ring, the tray member having opposing forward and rear edges, said tray member including an enclosure formed thereon, the enclosure including first and second flanges, the first flange being attached to said tray member proximate to said tray member forward edge and defining a forward portion of said enclosure, the second flange being attached to said tray member proximate to said tray member rear edge and defining a rear portion of said enclosure, said enclosure partially enclosing said attachment ring and capturing said glide members in a raceway defined between said first and second flanges and said tray member.

12. The mounting assembly of claim 11, wherein said glide members are formed from a lubricous material.

13. The mounting assembly of claim 11, wherein each of said glide members has a central body portion and two opposing enlarged head portions, one of said glide member head portions slidably contacting said tray member and the other of said glide member head portions slidably contacting with said flanges.

14. The mounting assembly of claim 11, wherein each of said two flanges includes an inner curved edge which are disposed radially outwardly of said spacers with respect to a central axis of said attachment ring and radially inwardly of said glide members with respect to the central axis of said attachment ring.

15. The mounting assembly of claim 11, wherein said first flange is rigidly attached to said tray member and said second flange is attached to said tray member with security fasteners.

16. The mounting assembly of claim 11, wherein said tray member forward edge has a width greater than said tray member rear edge and said second flange has a width equal to said tray member rear edge width.

17. The mounting assembly of claim 16, wherein said first flange has a width greater than said second flange and less than said tray member forward edge.

18. The mounting assembly of claim 11, wherein said first flange has opposing leading and trailing edges, the first flange leading edge being disposed proximate to said tray member forward edge and said first flange trailing edges being disposed rearwardly of a central axis of said attachment ring.

19. A mounting assembly for an appliance, the mounting assembly comprising:

a base member for securement to a flat support surface, the base member having a plurality of apertures therein which are adapted to receive a corresponding plurality of fastening members extending through the base member apertures to secure said base member to the support surface, said base member having an outer periphery and a plurality of glides disposed along said outer periphery in spaced-apart order, the glides being disposed on said base member radially outwardly of said base member apertures relative to a central axis of said base member, a tray member operatively associated with said base member and rotatably engaging said base member, the tray member having a support surface that opposes said appliance and further having a plurality of openings disposed therein adapted to receive fastening elements therethrough to mount said appliance to said tray member, said tray member having an enclosure which at least partially encloses said base member and forms a raceway for said base member glides, the tray member enclosure including first and second flanges mounted to said tray member, each of the first and second flanges having a bearing surface and an interior radial edge radially interposed between said base member glides and said base member fastening member apertures with respect to said base member central axis, the first and second flange bearing surface respectively lying adjacent said first and second flange interior radial edges.

* * * * *